J. FOLEY.
Water-Filter.

No. 201,103. Patented March 12, 1878.

WITNESSES
Arthur W. Adams.
Wm M. Lifter

James Foley
INVENTOR

Essen Bro's,
ATTORNEYS

UNITED STATES PATENT OFFICE.

JAMES FOLEY, OF MONTREAL, QUEBEC, CANADA.

IMPROVEMENT IN WATER-FILTERS.

Specification forming part of Letters Patent No. 201,103, dated March 12, 1878; application filed August 16, 1877.

*To all whom it may concern:*

Be it known that I, JAMES FOLEY, of Montreal, Canada, have invented certain new and useful Improvements in Water-Filters; and I do hereby declare that the following is a full, clear, and exact description thereof, which will enable others skilled in the art to which it appertains to make and use the same, reference being had to the accompanying drawings, and to letters of reference marked thereon, which form a part of this specification, and in which—

Figure 1:
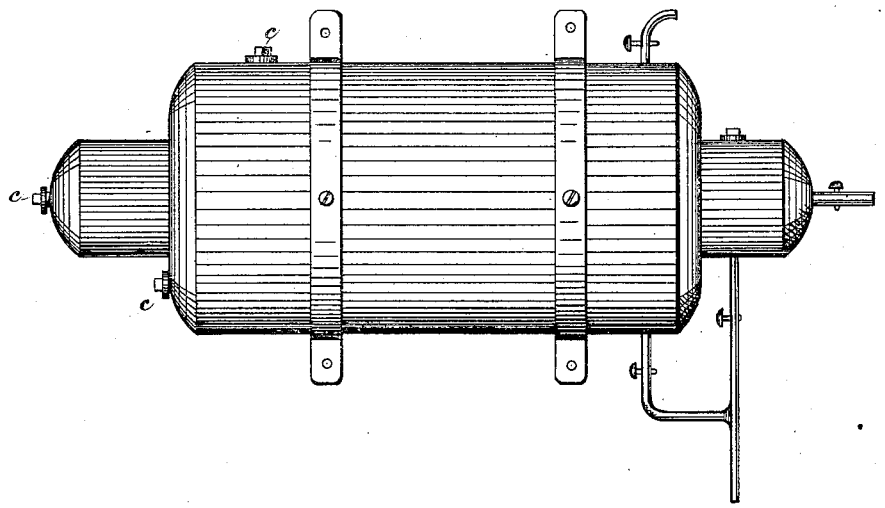
Figure 2:
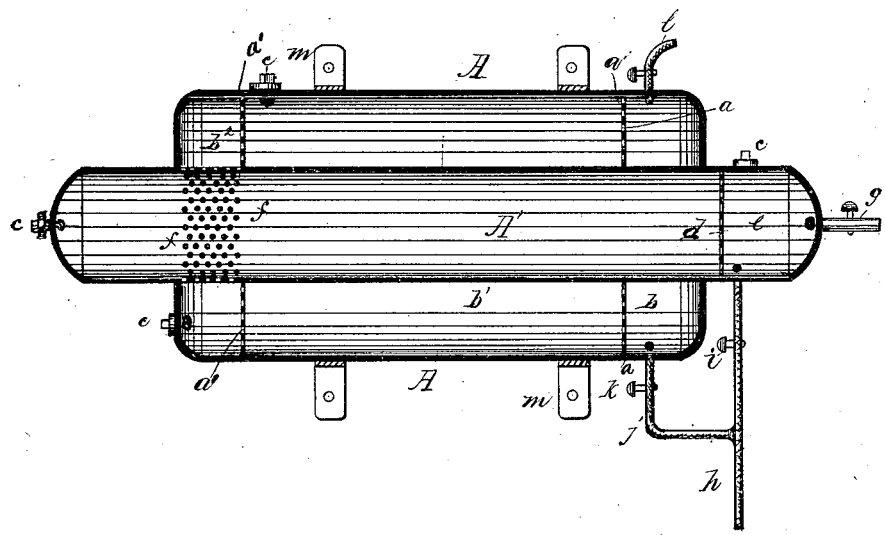

Figure 1 is a side view of my improved water-filter, and Fig. 2 is a vertical or longitudinal section of the same.

Corresponding parts in the two figures are denoted by like letters.

This invention relates to certain improvements in that class of water-filters adapted for attachment to the service-pipe in houses; and it consists, principally, of two or more concentric tanks, having perforations and perforated diaphragms or partitions and suitable filtering media, substantially as hereinafter more fully set forth.

In the annexed drawing, A A' refer to two tanks of different diameters, and arranged concentrically with each other, the inner one, A', being preferably extended beyond the outer one at both its upper and lower ends.

The outer tank A is provided in its lower portion with a perforated diaphragm or partition, $a$, encircling the inner tank A', and in its upper portion with a similar diaphragm or partition, $a'$, dividing the said tanks into three compartments or chambers, $b\ b^1\ b^2$, respectively, for water filtering or purifying media and air. This tank (as is also the tank A') is provided with tap-screws or ports $c\ c$, to permit of access to, and the removal and replacing of, the filtering media.

The inner tank A' is provided in its lower extension with a perforated partition or diaphragm, $d$. Within the chamber $e$ formed between the said partition and lower end of the said tank is placed sponge or other filtering and purifying medium. The upper portion of the tank A' is perforated, as at $f\ f$, at a point above the perforated partition $a'$ of the tank A' and below the upper end of the tank A.

The said lower extension of the tank A' is provided with a flushing-cock, $g$.

$h$ is the ingress-pipe, connecting with the service-pipe of the house and the tank A' at a point below the perforated partition $d$. This pipe $h$ is provided with a cock, $i$. An elbow or pipe, $j$, connects it (the ingress-pipe) with the outer tank A. The pipe $j$ is provided with a cock, $k$. $l$ is the discharge-cock attached to the outer tank A.

By opening the cock or valve $i$ the water from the ingress-pipe $h$ is caused to enter the chamber $e$ of the inner tank A', and pass up through its perforated diaphragm or partition $d$, through its filtering or purifying medium, and out of the said tank through the perforations $f\ f$ into the air-chamber $b^2$ of the tank A; thence down through its perforated partition or diaphragm $a'$, through its filtering medium, and through a second perforated partition, $a$, after which it can be drawn off in a purified state through the cock or valve $l$, for drinking.

By closing the cocks $i$ and $l$ and opening the cock $g$, a reverse flow of the water is produced to flush or cleanse the different chambers, &c., of the filter, it being directed up through the outer tank and its perforated partitions or diaphragms and filtering medium, and into the tank A' through its perforations $f\ f$, and down through said tank and its perforated diaphragm or partition $d$, when it is discharged through the cock or valve $g$.

The filter can be fastened in an upright position by means of straps or bands $m\ m$ fastened to the outer tank, and having their ends perforated to receive fastenings to secure them to a board or other medium placed in position against the wall of the house.

By closing the valve $k$ and opening the valves or cocks $i$ and $g$, the water can be drawn off unfiltered.

Having thus described my invention, what I claim, and desire to secure by Letters Patent, is—

1. In a water-filter, and in combination, two or more concentric tanks, A A', having the perforations $f\ f$ and perforated partitions or diaphragms $a\ a'\ d$, substantially as and for the purpose set forth.

2. In a water-filter, and in combination, two or more concentric tanks, A A', having perforations $f\ f$, perforated partitions $a\ a'\ d$, pipes $h\ j$, and cock $l$, substantially as and for the purpose set forth.

3. In a water-filter, and in combination, two or more concentric tanks, A A', having perforations $f\ f$, perforated partitions $a\ a'\ d$, pipes $h\ j$, and cock $g$, substantially as and for the purpose set forth.

In testimony that I claim the foregoing as my own I hereunto affix my signature in presence of two witnesses.

JAMES FOLEY.

Witnesses:
 C. CUSHING,
 S. HERBERT BERNARD.